(12) United States Patent
Adachi et al.

(10) Patent No.: US 7,374,843 B2
(45) Date of Patent: May 20, 2008

(54) POLYOLEFIN MICROPOROUS MEMBRANE AND METHOD OF EVALUATING THE SAME

(75) Inventors: Masayuki Adachi, Fuji (JP); Takashi Ikemoto, Moriyama (JP); Hiroshi Sogo, Moriyama (JP)

(73) Assignee: Asahi Kasei Chemicals Corporations, Tokyo (JP)

( * ) Notice: Subject to any disclaimer, the term of this patent is extended or adjusted under 35 U.S.C. 154(b) by 559 days.

(21) Appl. No.: 10/493,834

(22) PCT Filed: Aug. 26, 2003

(86) PCT No.: PCT/JP03/10771

§ 371 (c)(1),
(2), (4) Date: Apr. 27, 2004

(87) PCT Pub. No.: WO2004/020511

PCT Pub. Date: Mar. 11, 2004

(65) Prior Publication Data

US 2005/0019665 A1    Jan. 27, 2005

(30) Foreign Application Priority Data

Aug. 28, 2002 (JP) .............................. 2002-248913
Dec. 24, 2002 (JP) .............................. 2002-372353

(51) Int. Cl.
*H01M 2/16* (2006.01)
*G01N 3/60* (2006.01)

(52) U.S. Cl. ..................... 429/249; 429/252; 429/254; 428/220; 374/57

(58) Field of Classification Search ................ 429/249, 429/251, 252, 254; 428/220, 304; 374/57
See application file for complete search history.

(56) References Cited

U.S. PATENT DOCUMENTS 6,048,607 A * 4/2000 Hashimoto et al. ...... 428/315.5

(Continued)

FOREIGN PATENT DOCUMENTS

CN    1194200 A    9/1998

(Continued)

OTHER PUBLICATIONS

Computer-generated English translation of JP 11-322989, from the Japanese Patent Office website (doc date Nov. 1999).*

(Continued)

*Primary Examiner*—Stephen J. Kalafut
(74) *Attorney, Agent, or Firm*—Birch, Stewart, Kolasch & Birch, LLP

(57) ABSTRACT

The invention relates to a microporous membrane, which is provided with high safety even under a condition that the interior temperature of a battery becomes high, and which has high permeability and high mechanical strength at the same time.

The polyolefin microporous membrane is characterized by a membrane thickness of 5 to 50 μm, a void content of 30 to 60%, a gas transmission rate of 40 to 300 sec/100 cc/20 μm, a piercing strength of not less than 2.5 N/20 μm and a break through temperature of not lower than 110° C.

The separator in accordance with the present invention is used to exhibit high safety under a high temperature condition as well as high permeability, and therefore it is particularly useful as a separator for miniaturized high capacity batteries of a non-aqueous electrolytic solution type.

8 Claims, 4 Drawing Sheets

U.S. PATENT DOCUMENTS

2002/0034689 A1* 3/2002 Hoshida et al. .............. 429/254
2002/0076615 A1 6/2002 Tanaka et al. .............. 429/249

FOREIGN PATENT DOCUMENTS

| EP | 0 547 237 A1 | 6/1993 |
| EP | 0 574 588 A1 | 12/1993 |
| EP | 0 842 758 A2 | 5/1998 |
| EP | 1 101 792 A1 | 5/2001 |
| JP | 2-21559 A | 1/1990 |
| JP | 2-94356 A | 4/1990 |
| JP | 4-126352 A | 4/1992 |
| JP | 5-21050 A | 1/1993 |
| JP | 5-25305 A | 2/1993 |
| JP | 5-234578 A | 9/1993 |
| JP | 5-318585 A | 12/1993 |
| JP | 7-304110 A | 11/1995 |
| JP | 8-64194 A | 3/1996 |
| JP | 9-220453 A | 8/1997 |
| JP | 11-021370 A | 1/1999 |
| JP | 11-322989 A | 11/1999 |
| JP | 2000-212323 A | 8/2000 |
| JP | 2000-256491 A | 9/2000 |
| JP | 2002-284918 A | 10/2002 |
| JP | 2003-119306 A | 4/2003 |
| WO | WO 93/12920 A1 | 7/1993 |

OTHER PUBLICATIONS

Computer-generated English translation of JP 2000-256491, from the Japanese Patent Office website (doc date Sep. 2000).*

* cited by examiner

POLYOLEFIN MICROPOROUS MEMBRANE AND METHOD OF EVALUATING THE SAME

TECHNICAL FIELD

The present invention relates to a microporous membrane made of polyolefin having low gas transmission, superior permeability and superior strength and safety attributes. In particular, the present invention relates to a microporous membrane made of polyolefin which is useful as a separator used for high capacity-carrying lithium ion secondary batteries.

BACKGROUND ART

Microporous membranes made of polyolefin, such as polyethylene and polypropylene, have been used as separators for batteries such as lithium ion secondary batteries, wherein non-aqueous electrolytic solutions are used. Such a polyolefin separator is known to have high chemical resistance and moreover shutdown function, by which the micropores are blocked up at a temperature close to the melting point of a material due to melting thereof. Therefore, the separator can also play the role of a safety element that, when an abnormal reaction occurs in a battery to raise the battery temperature, terminates the battery reaction by shutdown so as to prevent the battery temperature from rising abnormally. From the viewpoint of the shutdown function, a polyethylene separator having a low melting point is more advantageous. Thus, JP-A-5-25305, JP-A-8-64194 and JP-A-8-29174 disclose techniques where a low density polyethylene having a low melting point is mixed into a high density polyethylene, thereby lowering the shutdown temperature.

On the other hand, when the interior temperature of the battery becomes high, the separator arranged between the electrodes may be ruptured or shrink, so that the electrodes may be contacted with each other, thereby causing an inner electrical short. For the purpose of avoiding such a trouble and keeping the geometry unchanged without rupture of the membrane up to a high temperature, various techniques are disclosed. For example, JP-A-4-126352 and JP-A-5-234578 disclose a blend of polyethylene and polypropylene, and JP-A-7-304110 discloses the lamination of a polyethylene separator and a polypropylene separator.

However, if the heat shrinking force and the heat shrinking percentage in a vertical direction toward the winding direction of a laminate of electrodes and a separator (in other words, in a transverse direction to the separator) are large, a phenomenon occurs that the separator shrinks and goes inside the electrodes when the interior temperature of the battery becomes high. As a result, the electrodes are exposed at both ends of plus and minus electrodes to cause an inner electrical short. Since the battery safety is not ensured for this reason, a further improvement has been desired.

Further, for the purpose of controlling the inner electrical short that may occur when the interior temperature of the battery becomes high, a temperature at which the separator is broken through is important as well as the heat shrinkage properties thereof. The separator becomes susceptible to be broken through by projections, such as electrodes, when exposed to a high temperature, thereby causing the inner electrical short. On the contrary, when the separator is hardly broken through even under a high temperature condition, it is possible to control the inner electrical short and ensure the battery safety. In particular, such a break through temperature of the separator becomes more important for battery safety as the battery capacity becomes higher and the separator becomes thinner.

Accordingly, the property that a temperature at which the pores of the separator are blocked up is low, or the property that the temperature at which the membrane is ruptured is high, alone is hardly able to inhibit the inner electrical short that occurs under a condition where the interior temperature of the battery becomes high and thus to ensure the safety. Hence, it important for the separator that the break through temperature is high and the shrinking force and shrinking percentage in the transverse direction are low under a high temperature condition.

In addition to the above-mentioned safety attributes, properties required for the separator for batteries are high permeability and high strength. For example, JP-A-2-21559 discloses a technique for preparing a separator for batteries by heat-mixing polyethylene having a viscosity average molecular weight of not higher than 300,000 and polyethylene having a viscosity average molecular weight of not lower than 1,000,000 in a good solvent to form a gel film; removing the solvent; and then uniaxially or biaxially stretching the gel film to obtain a separator. However, the disclosure of the specification thereof is actually limited only to a separator obtained through uniaxial stretching, and its porosity (in the present invention, this is defined as void content) is 80% and its strength is pretty low. In addition, the techniques disclosed in JP-A-2-94356 and JP-A-5-21050 are also related to uniaxial stretching in the machine direction.

When a membrane is highly oriented only in a single direction like the membranes obtained through uniaxial stretching as disclosed in those literatures, only membranes which are easily torn, low in piercing strength at ambient temperature and also low in the break through temperature can be obtained.

JP-A-5-318585 discloses a technique, in which a high molecular weight polyethylene having an intrinsic viscosity [η] of 5 or more is used and a membrane is prepared through a biaxial stretching carried out so as to obtain strength in the machine direction higher than that in the transverse direction. The technique comprises carrying out the transverse stretching and the longitudinal stretching in this order, and the magnifying power of the longitudinal stretching is larger than that of the transverse stretching. Therefore, even when the longitudinal stretching is carried out after the extraction of any plasticizer while keeping the length in the transverse direction constant, closure of the pores upon longitudinal stretching cannot be prevented from occurring. As a result, a sufficient permeability can hardly be obtained. Moreover, the piercing strength is low and the break through temperature is low, because of high orientation in the machine direction.

In a technique disclosed in JP-A-11-322989, a microporous membrane, which is low in its transverse shrinkage, and a method for the production thereof are included. However, the disclosure of the specification thereof is limited only to a membrane, which is high in its porosity and low in its piercing strength. Further, the membranes disclosed therein are those obtained through uniaxial stretching, and therefore its break through temperature is low.

JP-A-2003-119306 discloses a microporous membrane, which is low in its transverse shrinkage under high temperature conditions, and a method for the production thereof. The disclosure of the specification thereof is limited only to the lowering of shrinkage, and there is no mention of the strength of the microporous membrane under conditions including high temperature conditions. Further, the examples described therein only illustrate microporous membranes, which are high in gas transmission rate. In such microporous membranes, the low gas transmission rate, the high strength and the high break through temperature, as defined in the present invention, can barely be achieved at the same time.

As mentioned above, a microporous membrane having high permeability and high strength, which is provided with high safety when used as a separator for batteries even under high temperature conditions has not been obtained hitherto.

An object of the present invention is to provide a microporous membrane having high permeability and high strength, which is provided with high safety when used as a separator for a battery even under high temperature conditions.

DISCLOSURE OF INVENTION

As a result of extensive studies to accomplish such an object, the present inventors have found the fact that a microporous membrane made of polyethylene, having characteristic features mentioned in the following item (1) is a microporous membrane superior in permeability, strength and safety attributes as a separator. That is, the embodiments of the present invention include the following.

(1) A polyolefin microporous membrane having a membrane thickness of 5 to 50 μm, a void content of 30 to 60%, a gas transmission rate of 40 to 300 sec/100 cc/20 μm, a piercing strength of not less than 2.5 N/20 μm and a break through temperature of not lower than 110° C.

(2) The polyolefin microporous membrane according to the item (1), characterized in that the membrane has a maximum shrinkage stress in the transverse direction of not more than 363 kPa and/or a shrinking percentage at 130° C. in the transverse direction of not more than 25%.

(3) The polyolefin microporous membrane according to the item (1) or (2), which comprises a polyolefin having an intrinsic viscosity of 3.5 to 9 dl/g, and which has a bubble point (B.P.) of 196 to 490 kPa and a shutdown temperature of 138 to 150° C.

(4) The polyolefin microporous membrane according to any one of the items (1) to (3), which has a membrane thickness of 5 to 22 μm, a void content of 35 to 60%, a gas transmission rate of 40 to 260 sec/100 cc/20 μm, and a piercing strength of not less than 2.8 N/20 μm.

(5) The polyolefin microporous membrane according to any one of the items (1) to (4), which has a membrane thickness of 5 to 20 μm, a void content of 40 to 60%, a gas transmission rate of 40 to 200 sec/100 cc/20 μm, a piercing strength of not less than 3.0 N/20 μm, and a break through temperature of not lower than 120° C.

(6) The polyolefin microporous membrane according to any one of the items (1) to (5), which is produced by using a composition comprising at least a polyolefin, an organic liquid material and silica.

(7) A separator for non-aqueous electrolytic solution type batteries, comprising the polyolefin microporous membrane according to any one of the items (1) to (6).

(8) A method for evaluating a heat resistance property of a microporous membrane, comprising:
preparing a cell by overspreading a piece of a microporous membrane over a pointed end element having a pointed end like a needle, which is fixed on a support at its end opposite to the pointed end, and fixing the microporous membrane to the support in at least one direction;
heating the cell; and
measuring the temperature at which the pointed end breaks through the microporous membrane.

BRIEF DESCRIPTION OF DRAWINGS

FIG. 1A shows the sizes of each part of a drawing pin. FIG. 1B shows an enlarged view of a pointed end of the drawing pin. FIG. 1C shows a state where the drawing pin is set on a glass plate, and FIG. 1D shows the state of the cell for measurement (an arrow shows the longitudinal direction of the microporous membrane).

FIG. 3A is an overall schematic drawing, FIG. 3B is a drawing showing a nickel (Ni) foil 22a in FIG. 3A and a microporous membrane 21 fixed thereon, and FIG. 3C is a drawing showing a Ni foil 22b in FIG. 3A.

BEST MODE FOR CARRYING OUT THE INVENTION

Figure 1B:
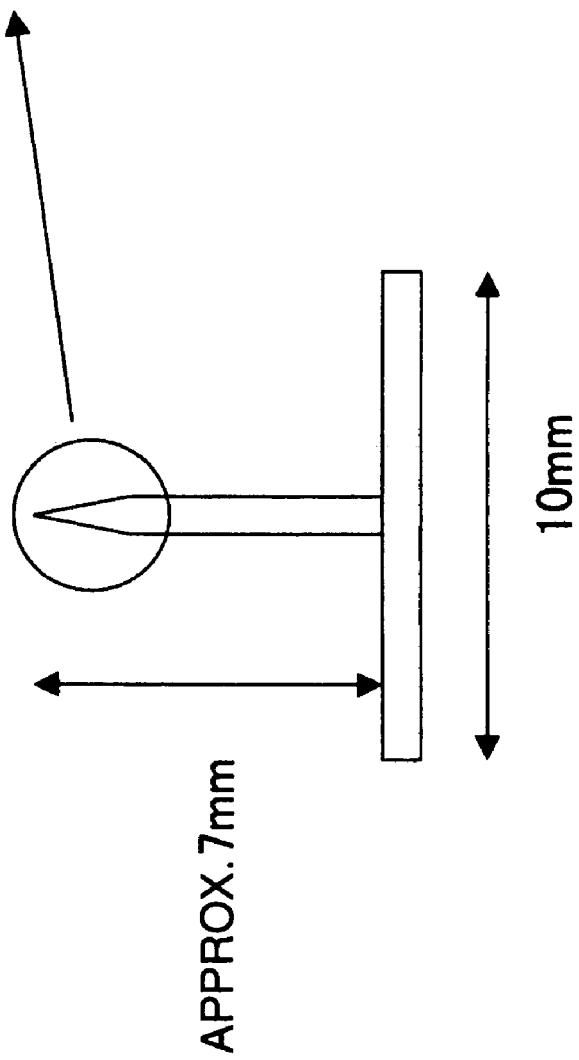
FIG. 1A to FIG. 1D are exemplary schematic drawings showing a cell used for measuring the break through temperature defined herein.
Figure 1A:
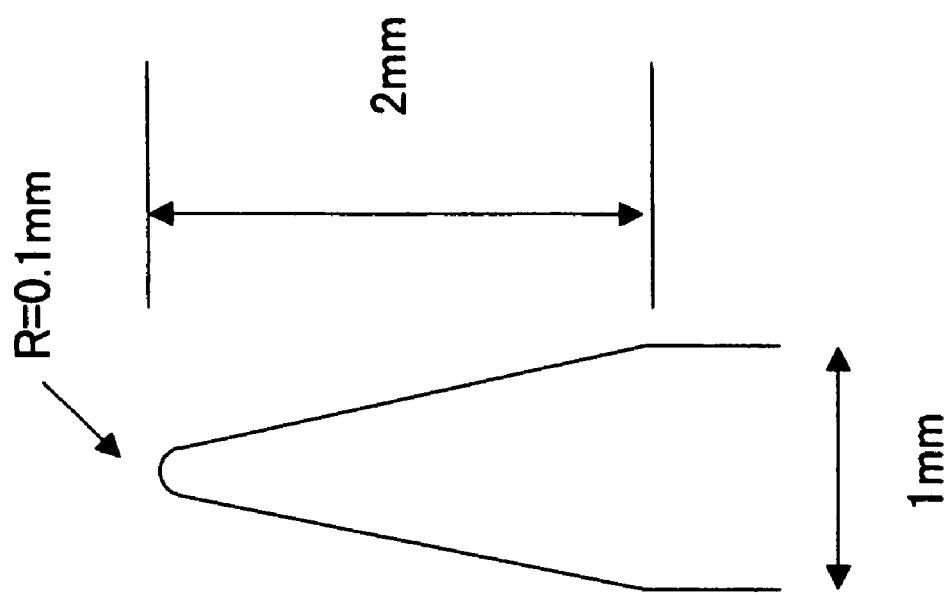

The present invention is explained hereinbelow in detail, particularly with respect to preferred modes thereof.

The membrane thickness of the polyolefin microporous membrane in accordance with the present invention is from 5 to 50 μm. From the viewpoint of the membrane strength and considering the trend toward the miniaturization and reduction in weight of batteries, it is preferably from 5 to 24 μm, more preferably from 5 to 22 μm, and much more preferably from 5 to 20 μm. When the membrane thickness is less than 5 μm, sufficient strength cannot be obtained. When it exceeds 50 μm, the permeability is deteriorated.

The void content is from 30 to 60%. From the viewpoint of the membrane strength and electrical properties, it is preferably from 35 to 60%, and more preferably from 40 to 60%. When the void content is less than 30%, the permeability is deteriorated, and when it exceeds 60%, sufficient strength cannot be obtained.

The gas transmission rate is from 40 to 300 sec/100 cc/20 μm. From the viewpoint of the safety and electrical properties, it is preferably from 40 to 280 sec/100 cc/20 μm, more preferably from 40 to 260 sec/100 cc/20 μm, much more preferably from 40 to 200 sec/100 cc/20 μm, further much more preferably from 50 to 150 sec/100 cc/20 μm, and the most preferably from 50 to 100 sec/100 cc/20 μm. When the gas transmission rate is less than 40 sec/100 cc/20 μm, the permeability is too much, thereby decreasing the safety, and when it exceeds 300 sec/100 cc/20 μm, the electrical properties are deteriorated.

The piercing strength is not less than 2.5 N/20 μm. It is preferably not less than 2.8 N/20 μm, and more preferably less than 3.0 N/20 μm. A piercing strength of less than 2.5 N/20 μm creates problems of safety and handling.

The break through temperature is not lower than 110° C. It is preferably not lower than 115° C., and more preferably not lower than 120° C. When the break through temperature is lower than 110° C., an inner electrical short easily occurs when the interior temperature of the battery becomes high, and for this reason the safety is deteriorated.

With respect to shrinkage in the transverse direction, it is preferred that the maximum shrinkage stress is not more than 363 kPa, or the shrinking percentage at 130° C. is not more than 25%. In order to ensure high safety, it is more preferred that both are satisfied at the same time. With respect to the maximum shrinkage stress, it is preferably not more than 294 kPa, and much more preferably not more than 245 kPa. With respect to the shrinking percentage at 130° C. in a transverse direction, it is preferably not more than 20%.

In order to obtain a membrane having low maximum shrinkage stress and low shrinking percentage at 130° C., it is preferred that the melting point of the membrane is not lower than 133° C. More preferred is not lower than 135° C. However, when it exceeds 145° C., the shutdown temperature becomes too high, and therefore, it is preferred that the melting point of the membrane is not higher than 145° C. More preferred is not higher than 140° C.

In order to obtain high strength, it is preferred that the intrinsic viscosity [η] of the polyolefin microporous membrane is not less than 3.5. It is more preferably not less than 4.5, and much more preferably not less than 5.5. However, when the intrinsic viscosity exceeds 9, the membrane formability may be deteriorated, and therefore, it is preferred that the intrinsic viscosity is not more than 9. More preferred is not more than 8.

It is preferred that the bubble point is from 196 to 490 kPa. From the viewpoints of the membrane strength and electrical properties, it is preferably from 245 to 441 kPa, and more preferably from 294 to 441 kPa.

In addition, it is preferred that the electrical resistance is not more than 2.5 Ω·cm²/20 µm. It is more preferably not more than 2 Ω·cm²/20 µm, and much more preferably not more than 1.5 Ω·cm²/20 µm.

It is preferred that the shutdown temperature is from 138 to 150° C. More preferred is from 138 to 145° C. It is preferred that the temperature at which the membrane is ruptured is not lower than 153° C. More preferred is not lower than 155° C. When the shutdown temperature and the membrane-rupture temperature are controlled within the ranges mentioned above, the separator obtained will be more preferred because of improved safety and permeability.

The polyolefin used in the present invention may be any polyolefin or any polyolefin composition. The examples of the polyolefin include polyethylene, polypropylene and poly-4-methyl-1-pentene. In use, two or more thereof may be blended. In order to obtain safety at a high temperature, it is recommended to use the mixture of polyethylene and polypropylene. On the other hand, in order to obtain much higher permeability, it is recommended to use polyethylene singly.

With respect to the kinds of polyethylene used in the present invention, high density polyethylene having a density exceeding 0.94 g/cm³, medium density polyethylene having a density of from 0.93 to 0.94 g/cm³, low density polyethylene having a density of lower than 0.93 g/cm³, linear low density polyethylene and so on, are included. In order to increase the melting point of the membrane to 133° C. or higher, it is recommended to use the high density polyethylene and the medium density polyethylene, which may be used singly or in a combination thereof.

With respect to the kinds of polypropylene used in the present invention, propylene homopolymer, ethylene-propylene random copolymer and ethylene-propylene block copolymer, are included. It is preferred that the ethylene content of the total polypropylene to be used is not more than 1 mol %, and it is more preferred that it is entirely the propylene homopolymer. It is preferred that the intrinsic viscosity [η] of the polypropylene used is from 1 to 25 dl/g. More preferred is from 2 to 7 dl/g.

The optimum composition of the polyolefin to obtain safety under a high temperature condition, high permeability and high strength, comprises a mixture of an ultra high molecular weight polyethylene having an intrinsic viscosity [η] of from about 5 to about 20 dl/g and a high density polyethylene having an intrinsic viscosity [η] of from about 1.5 to about 4 dl/g, provided that they are blended so as to make the intrinsic viscosity [η] of polyethylene in the membrane preferably within the range from 3.5 to 9 dl/g, more preferably within the range from 4 to 8 dl/g.

In order to obtain high strength, it is preferred that the ultra high molecular weight polyethylene is added in an amount of from 10 to 90 wt %. From the viewpoint of moldability, more preferred is from 10 to 80 wt %. In addition, in order to obtain high permeability, it is preferred that the high density polyethylene is added in an amount of from 10 to 90 wt %.

A method most suitably employed for obtaining the microporous membrane in accordance with the present invention comprises the following steps (a) to (f):

(a) a step of mixing a polyolefin, an organic liquid material and/or silica and an additive in a Henschel mixer or the like to perform granulation;

(b) a step of melt-kneading the blend obtained in step (a) in an extruder equipped with a T-die at its leading edge;

(c) a step of extruding the kneaded product obtained in step (b) from the T-die, rolling from both sides thereof with heated rolls, and thereafter cooling the resulting product to mold it into a sheet;

(d) a step of extraction-removing the organic liquid material and/or silica from the sheet-like molded product obtained in step (c), thereby obtaining a non-stretched microporous membrane;

(e) a step of stretching the non-stretched microporous membrane obtained in step (d) by at least three times in the machine direction; and (f) a step of carrying out stretching in the transverse direction subsequently to step (e), and thereafter heat-treating the resulting product at a temperature higher than the stretching temperature.

The step (a) to step (f) are explained in more detail as follows.

In step (a), the mixing proportion of the polyolefin is preferably from 10 to 50 wt %, more preferably from 20 to 40 wt % based on the total weight of the polyolefin, the organic liquid material and/or silica. When the proportion of the polyolefin is less than 10 wt %, the strength of the microporous membrane is likely to be insufficient. When it exceeds 50 wt %, the viscosity at the time of extrusion molding tends to increase excessively, thereby deteriorating membrane formability, or the void content is likely to decrease when the microporous membrane is molded.

As the organic liquid material, organic acid esters including phthalic acid esters such as dioctyl phthalate, diheptyl phthalate and dibutyl phthalate, adipic acid esters and glyceric acid esters; phosphoric acid esters such as trioctyl phosphate; liquid paraffin; solid wax; and mineral oil may be mentioned. Considering the compatibility with the polyethylene and for the purpose of obtaining a low gas transmission rate and obtaining a low bubble point, the phthalic acid esters are preferred. Incidentally, these materials may be used singly or in a combination.

The silica includes hydrophilic silica and hydrophobic silica. These may be used singly or in a combination. Incidentally, it is permitted that in addition to polyethylene, the organic liquid material and silica, various additives such as antioxidants, ultraviolet absorbers, lubricants and anti-blocking agents may be used when desired in such a manner that the present invention is not impaired.

In the stretching steps (e) and (f), it is preferred to apply a stretching-after-extraction method, wherein the organic liquid material and/or silica are (is) extracted and removed from the extrusion-molded sheet to make the sheet porous, before the stretching is carried out. In addition, it is preferred to carry out the stretching according to a sequential biaxial stretching method, wherein the stretching in the machine direction and the stretching in the transverse direction are carried out in this order. The stretching-after-extraction method has an advantage that the pores can be easily enlarged, and therefore it is not necessary to carry out the stretching at a high magnifying power in order to obtain a low gas transmission rate. As a result, in the step of stretching in a transverse direction, a low gas transmission rate can be obtained even by a low magnifying power. Thus, it is possible to prepare a microporous membrane having low gas transmission rate, low shrinkage stress and low shrinking percentage at the same time. An advantage of the sequential biaxial stretching method is to obtain a low gas transmission rate. In the case where the stretching in the machine direction is carried out on a roll at a high magnifying power, the permeability is characteristically deteriorated due to shrinkage in the width direction or the like. However, by employing the sequential biaxial stretching method in accordance with the present invention, wherein the transverse stretching is carried out after the longitudinal stretching, it is possible to prevent the permeability from deterioration. As a result, it is made possible to carry out the stretching in the machine direction at a high magnifying power, thereby obtaining a high strength and also obtaining a high melting point due to oriented crystallization. For this reason, the sequential biaxial stretching method, wherein the transverse stretching is carried out after the longitudinal stretching, is more preferred. Further, even from the viewpoint that a conventional stretching machine can be used, the sequential biaxial stretching method, wherein the transverse stretching is carried out after the longitudinal stretching, is more preferred.

Still further, by using the sequential biaxial stretching method, wherein the transverse stretching is carried out after the longitudinal stretching, it is possible to obtain good permeability in spite of the void content of from 30 to 60%. Therefore, such a method is advantageous also from the viewpoint of obtaining high strength.

Thus, the longitudinal stretching can be carried out at a high magnifying power and the transverse stretching at a necessary minimum magnifying power. Thereby, it is made possible to obtain a microporous membrane having high strength, low gas transmission rate and low shrinkage stress and low shrinking percentage in a transverse direction. For the purpose of making a membrane thinner and having higher strength and higher melting point, so that the transverse stretching and the heat treatment can be carried out at a higher temperature, it is preferred that the magnifying power of the stretching in the machine direction is not less than 3 times, preferably not less than 3.5 times and more preferably not less than 4 times, and the melting point of the membrane at the time of the longitudinal stretching is not lower than 133° C., and if possible, not lower than 135° C. However, when the magnifying power of the stretching is too high, the orientation in the machine direction is too much, so that the product becomes easily tearable in the machine direction at the time of stretching in the transverse direction. For this reason, the magnifying power of the longitudinal stretching is preferably not more than 7 times, more preferably not more than 6 times, and much more preferably not more than 5 times. It is preferred that the maximum shrinkage stress in the machine direction is not more than 3923 kPa, if possible, not more than 2940 kPa. Incidentally, it is permitted to laminate more than one membrane of the same or different kind at the time of the longitudinal stretching. Preferred is a laminate of two membranes. Such a lamination is desirable from the viewpoint of increasing the membrane quality. The magnifying power of the transverse stretching carried out after the longitudinal stretching is preferably from 1.5 to 3 times, and more preferably from 1.5 to 2.5 times from the viewpoint of obtaining a large pore size and lowering the shrinkage stress and shrinking percentage.

As mentioned above, the microporous membrane in accordance with the present invention can be obtained through stretching including the sequential biaxial stretching method, a simultaneous biaxial stretching method and the like. In such a case, the orientation degrees of polymer in the machine and transverse directions are largely related to the piercing strength and break through temperature of the microporous membrane and moreover to the shrinking percentage and shrinkage stress in the transverse direction. When the orientation of polymer is increased, the shrinking percentage and shrinkage stress in that direction becomes larger. For this reason, the magnifying power ratio of the stretching in the machine and transverse directions (i.e. magnifying power of longitudinal stretching/that of transverse stretching) carried out to orient the polymer is preferably from 0.75 to 3.5, more preferably from 1.0 to 3.0, and further more preferably from 1.5 to 3.0.

When the magnifying power ratio of the stretching in the machine and transverse directions is too high, the polymer is highly oriented only in the machine direction, the membrane becomes easily torn when contacted with a projection or the like and the break through temperature is lowered. When the magnifying power ratio of the stretching in the machine and transverse directions is too low, the polymer is oriented in the transverse direction, so that the shrinking percentage in the transverse direction and the shrinkage stress in the transverse direction are increased. As a result, the membrane becomes susceptible to be broken through under a high temperature condition.

Further, from the viewpoint of the heat shrinkage properties and break through temperature of the membrane, it is preferred that the heat treatment carried out after the stretching is carried out at a temperature of from 133 to 180° C. More preferably, the heat treatment is carried out at a temperature of from 135 to 180° C. Since the heat treatment carried out after the stretching is carried out at a temperature not lower than 133° C., the orientation of polymer at a temperature not higher than the heat treatment temperature is lessened, the shrinkage stress is lowered, and the membrane is hardly broken through even under a high temperature condition. On the other hand, when the heat treatment temperature exceeds 180° C., the melting of the polymer becomes vigorous and the gas transmission rate becomes high.

Incidentally, the heat treatment step includes a heat treatment accompanied with dimensional variation of the membrane.

Further, it is preferred that the stretching step and the heat treatment step are carried out continuously.

Here, a method for evaluating the heat resistance property of the microporous membrane in accordance with the present invention is explained as follows.

According to the heat resistance property evaluation process in accordance with the present invention, it is possible to measure how the microporous membrane is hardly broken through under a high temperature condition, which could not be measured according to conventional methods using heat shrinking percentage, heat shrinkage stress and piercing strength. Preferably, the present heat resistance property evaluation method is suitable for evaluating the heat resistance property of a separator used for non-aqueous electrolytic solution type batteries.

The pointed end element used for the measurement may be any one as far as it can be stably fixed on a support. It is recommended to use a drawing pin having a flat plate at its end opposite to the pointed end.

It is preferred that the curvature (R) of the pointed end in the pointed end element is from 0.01 to 1 mm. From the viewpoint of the strength of the pointed end and the reproduction of the battery inside, it is more preferably from 0.05 to 0.5 mm.

A support on which the pointed end element is fixed may be any one as far as the pointed end element can be stably fixed thereon. It is permitted to use a flat plate such as a glass plate and a metal plate. It is also permitted to determine the size thereof arbitrarily.

The size of the microporous membrane to be measured is not particularly limited, and it may be determined arbitrarily depending upon the size of the support to be used and the pointed end element.

It is necessary to fix a piece of the microporous membrane overspread on the pointed end element to the support in at least one direction. From the viewpoint of reproduction of the state of a separator inside of the battery, it is preferred to fix the microporous membrane in its machine direction.

With respect to a heating method for the measurement of heat resistance property, it is recommended to use an oven capable of entirely uniformly heating the cell to be measured.

It is preferred that the heating time for the measurement of heat resistance property is not less than 30 seconds from the viewpoint of uniform heating of the cell. Considering uniformity and time efficiency, more preferred is a period of time of from 5 to 60 minutes. According to the method of the present invention, the heat resistance property of the microporous membrane can be evaluated by measuring the temperature at which the pointed end breaks through the microporous membrane. When two or more samples are evaluated, it is recommended to make a comparison between the samples for a fixed heating time. In the present Examples, the heating time was a period of 15 minutes.

The above-mentioned invention is specifically illustrated in more detail with reference to Examples as follows. However, the modes for carrying out the present invention are not limited to the following Examples.

Various properties of the polyolefin microporous membrane in accordance with the present invention were evaluated according to the following test methods.

1. Membrane Thickness (μm)

Using a micro thickness measurement instrument manufactured by Toyo Seiki Co. (Type KBN, terminal diameter Φ of 5 mm, and measurement pressure of 62.47 kPa), membrane thickness was measured at an ambient temperature of 23±2° C.

2. Void Content (%)

A rectangular sample of X cm×Y cm was cut out, and the void content was calculated by the following equation (1).

$$\text{Void content} = \{1 - (10000 \times M/\rho)/(X \times Y \times T)\} \times 100 \quad (1)$$

In the equation (1), T: thickness of sample (μm), M: weight of sample (g), and ρ: density of resin 3. Gas Transmission Rate (sec/100 cc)

It is measured using a digital Oken type gas transmission tester (Type EG01), manufactured by Asahi Seiko K.K. The value obtained for the measured thickness of the membrane was converted to the corresponding value for a 20 μm thickness, which is taken as the gas transmission rate.

$$\text{Gas transmission rate (sec/100 cc)} = \text{measured gas transmission rate (sec/100 cc)} \times 20/\text{membrane thickness}$$

4. Piercing Strength (N)

A needle having a diameter of 1 mm and a curvature radius of the pointed end of 0.5 mm is mounted on a handy compression tester, Type KES-G5, manufactured by Katotec K.K., and a piercing test was carried out at a temperature of 23±2° C. and a moving speed of the needle of 0.2 cm/sec. The value obtained for the measured thickness of the membrane was converted to the corresponding value for 20 μm thickness, which is taken as the piercing strength.

$$\text{Piercing strength (N)} = \text{measured piercing strength} \times 20/\text{membrane thickness}$$

5. Break Through Temperature (° C.)

A microporous membrane is cut out in a size of 60 mm in the longitudinal direction and 40 mm in the transverse direction, thereby obtaining a measurement sample.

Figure 1D:
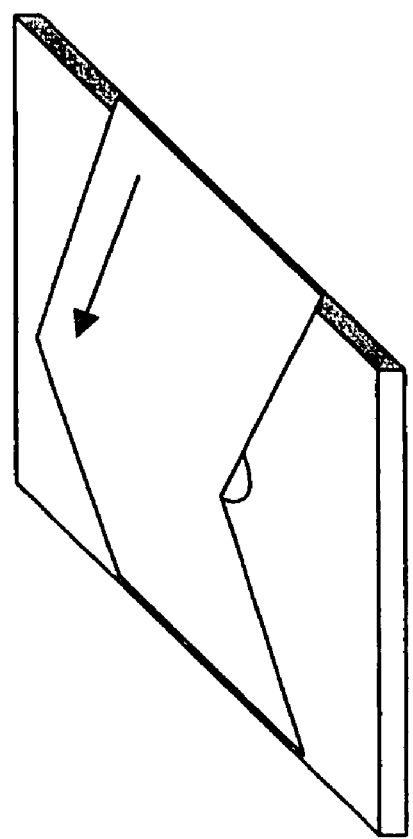
Figure 1C:
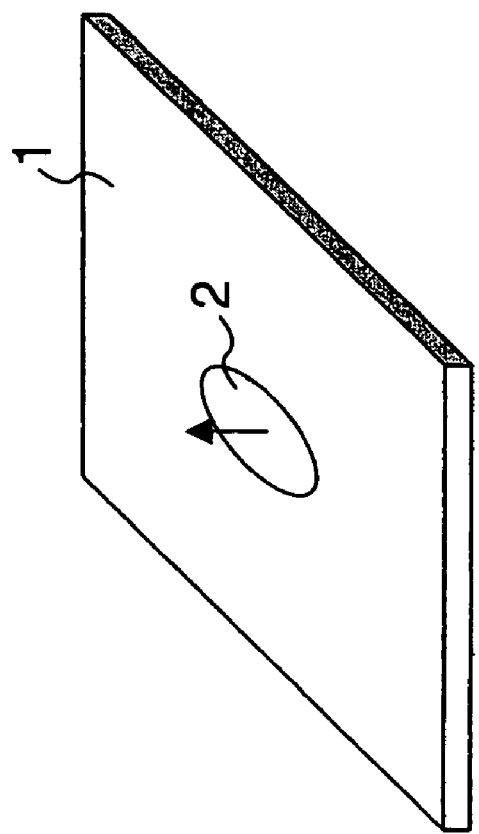

On the center of a glass plate 1 having a length of 80 mm, a width of 50 mm and a thickness of 3 mm, a drawing pin 2, product number KAHI-3, manufactured by Kooky Co., Ltd. (needle leg of about 7 mm, cylindrical portion diameter of about 10 mm, needle diameter of about 1 mm and pointed end R=0.2 mm) was placed and fixed with a heat resistant tape with the needle being in an upright position (refer to FIG. 1C). The sample is overspread over the glass plate 1 mounted with the drawing pin 2 so as to contact with the drawing pin in a vertical direction, and both ends of the membrane in the machine direction are fixed to the glass plate with a TEFLON (trademark) tape, thereby obtaining a measurement cell (FIG. 1D).

The measurement cell was allowed to stand in an oven kept at a measurement temperature for 15 minutes, thereafter the sample was taken out, and then whether or not the pointed end of the drawing pin breaks through the membrane to cut a hole was observed. The highest temperature at which no hole is cut was taken as the break through temperature.

The oven used for the measurement is ESPEC OVEN PH-101, manufactured by Tabai Espec Co.

6. Maximum Shrinkage Stress (Pa)

Using an apparatus for a thermomechanical analysis (TMA 120, manufactured by Seiko Instruments Inc.), the maximum shrinkage stress was measured under the following conditions.

Length of sample×width of sample: 10 mm×3 mm
Initial load: 1.2 g
Temperature raising speed: 10° C./min A maximum shrinkage load (g) was found from a shrinkage stress curve, and the maximum shrinkage stress was calculated by the following equation (2).

$$\text{Maximum shrinkage stress} = \{\text{maximum shrinkage load}/(3 \times T)\} \times 100 \times 9.807 \times 10000 \quad (2)$$

T: thickness of sample (μm)

Herein, the direction of the length of sample (10 mm) means the direction (longitudinal or transverse) intended to be measured.

7. Shrinking Percentage at 130° C. in a Transverse Direction

A microporous membrane is cut in a size of 120 mm×120 mm, thereby obtaining a sample, and four marks are produced on the respective four corners at intervals of 100 mm in the longitudinal and transverse directions. The marked sample is sandwiched in pieces of paper and allowed to stand in an oven of 130° C. for 60 minutes. When more than one sample is sandwiched, a piece of paper is sandwiched between the samples, the entire assembly is further sandwiched in pieces of paper, and then the resultant is allowed to stand in an oven. The sample is taken out of the oven and cooled, and thereafter the length between the marks in the transverse direction is measured. The shrinking percentage is calculated by the following equation (3).

$$\text{Shrinking percentage (\%)} = \{(\text{length in transverse direction before heating (100 mm)} - \text{length in transverse direction after heating})/\text{length in transverse direction before heating (100 mm)}\} \times 100 \quad (3)$$

Herein, the transverse direction means a direction vertical to a flow of a microporous membrane when the membrane is prepared by an extruder. If it is not known which direction of the sample is the machine direction (MD) or the transverse direction (TD) as of the time of production of the sample, it is acceptable that the measurement is carried out for both directions, and any one of the shrinking percentages is within a range of the preferred shrinking percentage as defined above.

The oven used for the measurement is ESPEC OVEN PH-101, manufactured by Tabai Espec Co.

8. Intrinsic Viscosity (dl/g)

As for the measurement of an intrinsic viscosity [η] of polyolefin both as the material and as a membrane, the intrinsic viscosity [η] in a decalin solvent at 135° C. is measured according to ASTM D4020.

9. Bubble Point (Pa)

A sample of a microporous membrane having a diameter Φ of 75 mm is dipped in ethanol to fill the pores with ethanol. Thereafter, pressure is applied thereto, and the pressure under which a bubble begins to develop from the membrane surface is read. The pressure value read is taken as the bubble point. Measurement temperature: 25±5° C.

10. Membrane Melting Point

The membrane melting point was measured using DSC-220C, manufactured by Seiko Instruments Inc. A microporous membrane is cut into a circle having a diameter of 5 mm. Several sheets are placed one over the other until the weight becomes 3 mg, thereby obtaining a sample. The sample is spread on the entire surface of an aluminum open sample pan having a diameter of 5 mm, covered with a clamping cover and then fixed in the aluminum pan with the aid of a sample sealer. The measurement is carried out under a nitrogen atmosphere at temperatures from 30° C. to 180° C. at a temperature raising speed of 10° C./min. The temperature at which a melting endothermic curve has a maximal value is taken as the membrane melting point.

11. Electrical Resistance (Ω·cm²)

Figure 2:
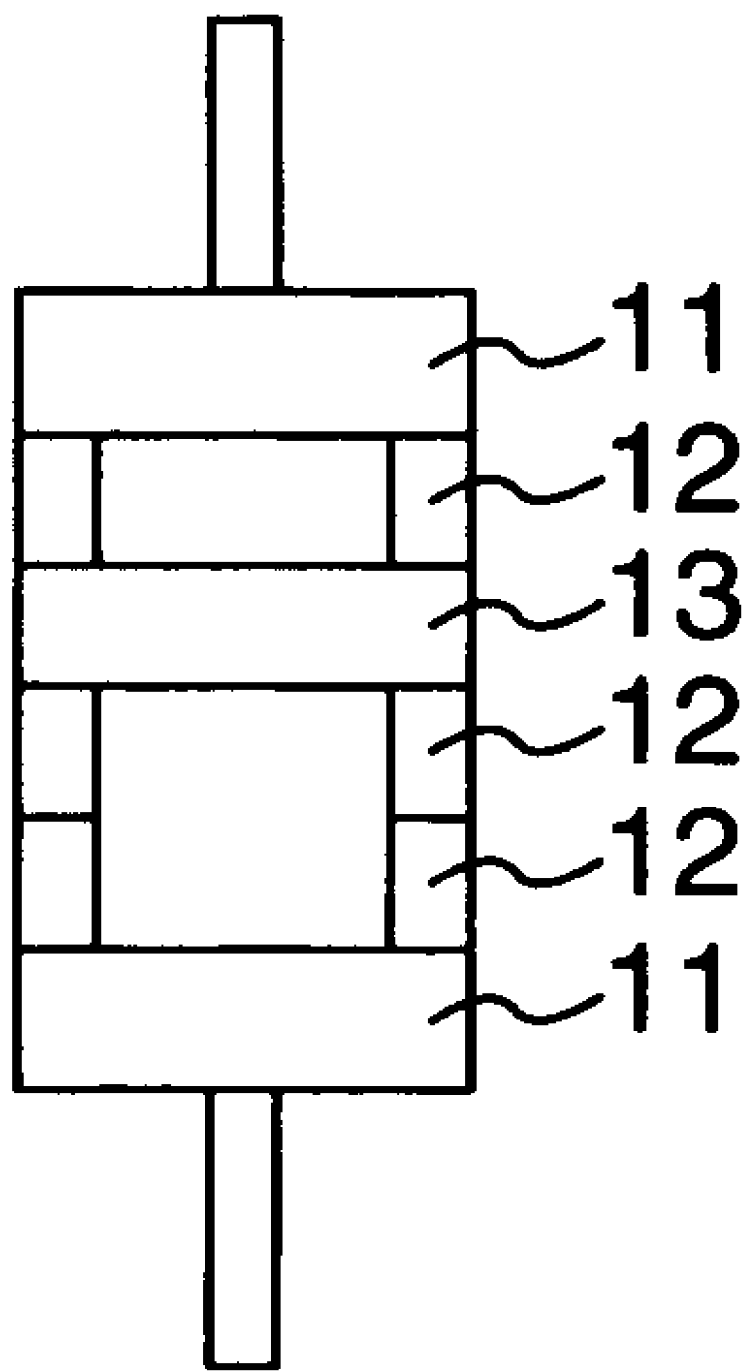
FIG. 2 is a schematic cross-sectional drawing showing a center section of a cylindrical cell used for measuring an electrical resistance of the microporous membrane in accordance with the present invention.

Using LCR meter (AG-4311), manufactured by Ando Denki Co., and the cell as shown in FIG. 2 (11: electrode, 12: TEFLON (trademark) packing (outer diameter of 2 cm, inner diameter of 1 cm and thickness of 1 mm), 13: microporous membrane), a measurement is carried out at an alternating current of 1 kHz. The electrical resistance is calculated by the following equation (4).

$$\text{Electrical resistance} = (\text{resistance value when a membrane is present} - \text{resistance value when no membrane is present}) \times 0.785 \quad (4)$$

Herein, the measurement is carried out under the following conditions.

Electrolytic solution: a solution prepared by mixing propylene carbonate containing 1 mol/L lithium perchlorate ($LiClO_4$) with dimethoxyethane (50/50 vol %)
Electrode: platinum black electrode
Area measured: 0.785 cm²
Distance between electrodes: 3 mm 12. Shutdown Temperature (° C.) and Membrane-Rupture Temperature (° C.)

Figure 3A:
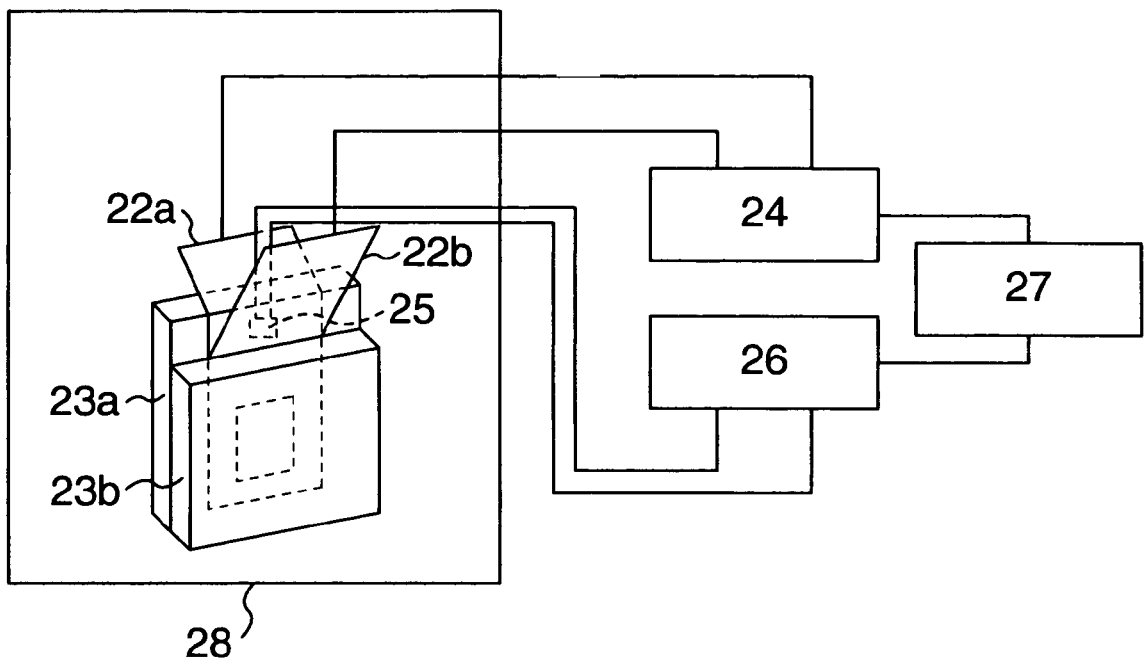
FIGS. 3A to 3C show the organization of an apparatus used for measuring a pore-blocking up temperature.
Figure 3B:
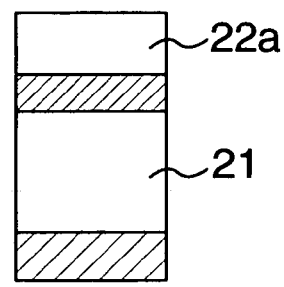
Figure 3C:
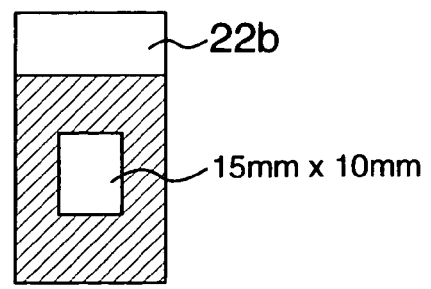

A schematic view showing an apparatus for measuring the shutdown temperature is shown in FIG. 3A to 3C. FIG. 3A shows an organization of the measurement apparatus. Numerals 22a and 22b indicate a Ni foil having a thickness of 10 μm, and numerals 23a and 23b indicate a glass plate. Numeral 24 indicates an electrical resistance measuring apparatus (LCR meter, AG4311, manufactured by Ando Denki Co.), which is connected with the Ni foil (22a and 22b). Numeral 25 indicates a thermocouple, which is connected to a thermometer 26. Numeral 27 indicates a data collector, which is connected to the electrical resistance measuring apparatus 24 and the thermometer 26. Numeral 28 indicates an oven, in which the microporous membrane is heated.

More specific description is given as follows. The microporous membrane 21 is impregnated with a prescribed electrolytic solution and, as shown in FIG. 3B, is fixed on the Ni foil 22a in such a manner that the membrane is held only in a longitudinal direction with the aid of a TEFLON (trademark) tape. The Ni foil 22b is masked with a TEFLON (trademark) tape, provided that a portion of 15 mm×10 mm is freed from masking, as shown in FIG. 3C. The Ni foil 22a and the Ni foil 22b are placed one over the other in such a manner that the microporous membrane is sandwiched between them, and further said two Ni foils are sandwiched between glass plates 23a and 23b. Said two glass plates are fixed with the aid of a commercially available clip. Using the apparatus as shown in FIG. 3A, a temperature and an electrical resistance are continuously measured. The temperature is increased at a speed of 2° C./min and the electrical resistance value is obtained at an alternating current of 1 kHz. A temperature at which the electrical resistance value of the microporous membrane 1 reaches 1000 Ω is defined to be the shutdown temperature. The temperature is further increased, and a temperature at which the shutdown membrane is ruptured and the electrical resistance value again reaches 1000 Ω is defined to be the membrane-rupture temperature.

The prescribed electrolytic solution is as follows.

Electrolytic solution: a mixed organic solvent of propylene carbonate/ethylene carbonate/γ-butyrolactone=25/25/50 vol %, which contains 1 mol/L lithium boron fluoride (LiBF$_4$) and 0.5 wt % trioctyl phosphate.

13. Density (g/cm$^3$)

The density of polyethylene is measured according to ASTM D1238.

EXAMPLE 1

3 Weight % of ultra high molecular weight polyethylene having an intrinsic viscosity [η] of 11.5 dl/g, 27 wt % of high density polyethylene having an intrinsic viscosity [η] of 2.8 dl/g, 50.6 wt % of dioctyl phthalate (DOP) and 19.4 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm. From the molded product, the DOP and pulverized silica were extraction-removed, thereby obtaining a microporous membrane. Two sheets of the microporous membrane were placed one over the other, stretched by 4.5 times in the machine direction at 110° C., thereafter stretched by 1.7 times in the transverse direction at 133° C., and finally heat-treated at 135° C. Physical properties of the thus-obtained microporous membrane are as shown in Tables 1 and 2.

EXAMPLE 2

4.5 Weight % of ultra high molecular weight polyethylene having an intrinsic viscosity [η] of 11.5 dl/g, 25.5 wt % of high density polyethylene having an intrinsic viscosity [η] of 2.8 dl/g, 50.6 wt % of dioctyl phthalate (DOP) and 19.4 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm. From the molded product, the DOP and pulverized silica were extraction-removed, thereby obtaining a microporous membrane. Two sheets of the microporous membrane were placed one over the other, stretched by 4.5 times in the machine direction at 110° C., thereafter stretched by 1.7 times in the transverse direction at 133° C., and finally heat-treated at 136° C. Physical properties of the thus-obtained microporous membrane are as shown in Tables 1 and 2.

EXAMPLE 3

6 Weight % of ultra high molecular weight polyethylene having an intrinsic viscosity [η] of 11.5 dl/g, 24 wt % of high density polyethylene having an intrinsic viscosity [η] of 2.8 dl/g, 50.6 wt % of dioctyl phthalate (DOP) and 19.4 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm. From the molded product, the DOP and pulverized silica were extraction-removed, thereby obtaining a microporous membrane. Two sheets of the microporous membrane were placed one over the other, stretched by 4.3 times in the machine direction at 110° C., thereafter stretched by 1.7 times in the transverse direction at 133° C., and finally heat-treated at 137° C. Physical properties of the thus-obtained microporous membrane are as shown in Tables 1 and 2.

EXAMPLE 4

11.2 Weight % of ultra high molecular weight polyethylene having an intrinsic viscosity [η] of 11.5 dl/g, 16.8 wt % of high density polyethylene having an intrinsic viscosity [η] of 2.8 dl/g, 52 wt % of dioctyl phthalate (DOP) and 20 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm. From the molded product, the DOP and pulverized silica were extraction-removed, thereby obtaining a microporous membrane. Two sheets of the microporous membrane were placed one over the other, stretched by 4.3 times in the machine direction at 110° C., thereafter stretched by 1.7 times in the transverse direction at 133° C., and finally heat-treated at 139° C. Physical properties of the thus-obtained microporous membrane are as shown in Tables 1 and 2.

EXAMPLE 5

9 Weight % of ultra high molecular weight polyethylene having an intrinsic viscosity [η] of 16 dl/g, 21 wt % of high density polyethylene having an intrinsic viscosity [η] of 2.8 dl/g, 50.6 wt % of dioctyl phthalate (DOP) and 19.4 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm. From the molded product, the DOP and pulverized silica were extraction-removed, thereby obtaining a microporous membrane. Two sheets of the microporous membrane were placed one over the other, stretched by 4.8 times in the machine direction at 115° C., thereafter stretched by 1.7 times in the transverse direction at 135° C., and finally heat-treated at 139° C. Physical properties of the thus-obtained microporous membrane are as shown in Tables 1 and 2.

EXAMPLE 6

9.2 Weight % of ultra high molecular weight polyethylene having an intrinsic viscosity [η] of 16 dl/g, 13.8 wt % of high density polyethylene having an intrinsic viscosity [η] of 2.8 dl/g, 56.7 wt % of dioctyl phthalate (DOP) and 20.3 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm. From the molded product, DOP and the pulverized silica were extraction-removed, thereby obtaining a microporous membrane. Two sheets of the microporous membrane were placed one over the other, stretched by 4.0 times in the machine direction at 110° C., thereafter stretched by 1.7 times in the transverse direction at 133° C., and finally heat-treated at 139° C. Physical properties of the thus-obtained microporous membrane are as shown in Tables 1 and 2.

EXAMPLE 7

8.4 Weight % of ultra high molecular weight polyethylene having an intrinsic viscosity [η] of 16 dl/g, 19.6 wt % of high density polyethylene having an intrinsic viscosity [η] of 2.8 dl/g, 52 wt % of dioctyl phthalate (DOP) and 20 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm. From the molded product, the DOP and pulverized silica were extraction-removed, thereby obtaining a microporous membrane. Two sheets of the microporous membrane were placed one over the other, stretched by 4.6 times in the machine direction at 115° C., thereafter stretched by 2 times in the transverse direction at 130° C., and finally heat-treated at 137° C. Physical properties of the microporous membrane thus-obtained are as shown in Tables 1 and 2.

EXAMPLE 8

8.4 Weight % of ultra high molecular weight polyethylene having an intrinsic viscosity [η] of 16 dl/g, 19.6 wt % of high density polyethylene having an intrinsic viscosity [η] of 2.8 dl/g, 52 wt % of dioctyl phthalate (DOP) and 20 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 100 μm. From the molded product, the DOP and pulverized silica were extraction-removed, thereby obtaining a microporous membrane. Two sheets of the microporous membrane were placed one over the other, stretched by 4.8 times in the machine direction at 115° C., thereafter stretched by 2.2 times in the transverse direction at 134° C., and finally heat-treated at 139° C. Physical properties of the microporous membrane thus-obtained are as shown in Tables 1 and 2.

EXAMPLE 9

8.4 Weight % of ultra high molecular weight polyethylene having an intrinsic viscosity [η] of 16 dl/g, 19.6 wt % of high density polyethylene having an intrinsic viscosity [η] of 2.8 dl/g, 52 wt % of dioctyl phthalate (DOP) and 20 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 100 μm. From the molded product, the DOP and pulverized silica were extraction-removed, thereby obtaining a microporous membrane. Two sheets of the microporous membrane were placed one over the other, stretched by 4.8 times in the machine direction at 115° C., thereafter stretched by 2.5 times in the transverse direction at 134° C., and finally heat-treated at 139° C. Physical properties of the microporous membrane thus-obtained are as shown in Tables 1 and 2.

EXAMPLE 10

19.2 Weight % of ultra high molecular weight polyethylene having an intrinsic viscosity [η] of 7.0 dl/g, 12.8 wt % of high density polyethylene having an intrinsic viscosity [η] of 2.8 dl/g, 48 wt % of dioctyl phthalate (DOP) and 20 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm. From the molded product, the DOP and pulverized silica were extraction-removed, thereby obtaining a microporous membrane. Two sheets of the microporous membrane were placed one over the other, stretched by 4.5 times in the machine direction at 115° C., thereafter stretched by 2.1 times in the transverse direction at 120° C., and finally heat-treated at 137° C. Physical properties of the microporous membrane obtained are as shown in Tables 1 and 2.

EXAMPLE 11

22.4 Weight % of ultra high molecular weight polyethylene having an intrinsic viscosity [η] of 5.5 dl/g, 9.6 wt % of high density polyethylene having an intrinsic viscosity [η] of 2.8 dl/g, 48 wt % of dioctyl phthalate (DOP) and 20 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm.

From the molded product, the DOP and pulverized silica were extraction-removed, thereby obtaining a microporous membrane. Two sheets of the microporous membrane were placed one over the other, stretched by 4.3 times in the machine direction at 115° C., thereafter stretched by 1.9 times in the transverse direction at 120° C., and finally heat-treated at 136° C. Physical properties of the microporous membrane thus-obtained are as shown in Tables 1 and 2.

EXAMPLE 12

22.4 Weight % of ultra high molecular weight polyethylene having an intrinsic viscosity [η] of 5.5 dl/g, 9.6 wt % of high density polyethylene having an intrinsic viscosity [η] of 2.8 dl/g, 48 wt % of dioctyl phthalate (DOP) and 20 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm.

From the molded product, the DOP and pulverized silica were extraction-removed, thereby obtaining a microporous membrane. Two sheets of the microporous membrane were placed one over the other, stretched by 4.3 times in the machine direction at 115° C., thereafter stretched by 2 times in the transverse direction at 120° C., and finally heat-treated at 137° C. Physical properties of the microporous membrane thus-obtained are as shown in Tables 1 and 2.

EXAMPLE 13

22.4 Weight % of ultra high molecular weight polyethylene having an intrinsic viscosity [η] of 5.5 dl/g, 9.6 wt % of high density polyethylene having an intrinsic viscosity [η] of 2.8 dl/g, 48 wt % of dioctyl phthalate (DOP) and 20 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm.

From the molded product, the DOP and pulverized silica were extraction-removed, thereby obtaining a microporous membrane. Two sheets of the microporous membrane were placed one over the other, stretched by 5 times in the machine direction at 115° C., thereafter stretched by 2.2 times in the transverse direction at 120° C., and finally heat-treated at 138° C. Physical properties of the microporous membrane thus-obtained are as shown in Tables 1 and 2.

EXAMPLE 14

22.4 Weight % of ultra high molecular weight polyethylene having an intrinsic viscosity [η] of 5.5 dl/g, 9.6 wt % of high density polyethylene having an intrinsic viscosity [η] of 2.8 dl/g, 48 wt % of dioctyl phthalate (DOP) and 20 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm.

From the molded product, the DOP and pulverized silica were extraction-removed, thereby obtaining a microporous membrane. Two sheets of the microporous membrane were placed one over the other, stretched by 5.5 times in the machine direction at 115° C., thereafter stretched by 2.2 times in the transverse direction at 120° C., and finally heat-treated at 139° C. Physical properties of the microporous membrane thus-obtained are as shown in Tables 1 and 2.

EXAMPLE 15

25.6 Weight % of ultra high molecular weight polyethylene having an intrinsic viscosity of 5.5 dl/g, 6.4 wt % of high density polyethylene having an intrinsic viscosity [η] of 2.8 dl/g, 48 wt % of dioctyl phthalate (DOP) and 20 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm.

From the molded product, the DOP and pulverized silica were extraction-removed, thereby obtaining a microporous membrane. Two sheets of the microporous membrane were placed one over the other, stretched by 4.8 times in the machine direction at 115° C., thereafter stretched by 2 times in the transverse direction at 120° C., and finally heat-treated at 138° C. Physical properties of the microporous membrane thus-obtained are as shown in Tables 1 and 2.

EXAMPLE 16

17.9 Weight % of ultra high molecular weight polyethylene having an intrinsic viscosity [η] of 5.5 dl/g, 7.7 wt % of high density polyethylene having an intrinsic viscosity [η] of 2.8 dl/g, 6.4 wt % of high density polyethylene having an intrinsic viscosity [η] of 1.8 dl/g, 48 wt % of dioctyl phthalate (DOP) and 20 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm. From the molded product, the DOP and pulverized silica were extraction-removed, thereby obtaining a microporous membrane. Two sheets of the microporous membrane were placed one over the other, stretched by 4.8 times in the machine direction at 115° C., thereafter stretched by 2 times in the transverse direction at 120° C., and finally heat-treated at 135° C. Physical properties of the microporous membrane thus-obtained are as shown in Tables 1 and 2.

EXAMPLE 17

50 Weight % of ultra high molecular weight polyethylene having an intrinsic viscosity [η] of 7.0 dl/g and 50 wt % of high density polyethylene having an intrinsic viscosity [η] of 2.8 dl/g were dry-blended with a tumbler blender, thereby obtaining a polymer blend. Into the cylinder of a twin screw extruder, liquid paraffin was introduced through a pump, while feeding the polymer blend thereto through a feeder. In the melt-kneading of the mixture, the feeder and the pump were adjusted so as to make the liquid paraffin content in the extruded mixture as a whole 62 wt %. Thereafter, the extrusion product was passed through a T-die and rolled with cooling rolls controlled to a surface temperature of 30° C., thereby obtaining a sheet like molded product.

Successively, the molded product was led to a simultaneous biaxial tenter stretching machine, in which a simultaneous biaxial stretching was carried out at 120° C. with magnifying powers in the machine direction and in the transverse direction of 7.0 times and 6.1 times, respectively. Thereafter, the liquid paraffin was extraction-removed.

Further, the resulting product was led to a TD tenter thermo-fixing machine, in which stretching at a ratio of 1.05 was carried out at 125° C., and finally heat-treatment was carried out at 135° C. Physical properties of the microporous membrane thus-obtained are as shown in Tables 1 and 2.

EXAMPLE 18

50 Weight % of ultra high molecular weight polyethylene having an intrinsic viscosity [η] of 7.0 dl/g, 47 wt % of high density polyethylene having an intrinsic viscosity [η] of 2.8 dl/g and 3 wt % of homopolypropylene having an intrinsic viscosity [η] of 3.3 dl/g were dry-blended with a tumbler blender, thereby obtaining a polymer blend. Into the cylinder of a twin screw extruder, liquid paraffin was introduced through a pump, while feeding the polymer blend thereto through a feeder. In the melt-kneading of the mixture, the feeder and the pump were adjusted so as to make the liquid paraffin content in the extruded mixture as a whole 62 wt %. Thereafter, the extrusion product was passed through a T-die and rolled with cooling rolls controlled to a surface temperature of 30° C., thereby obtaining a sheet like molded product.

Successively, the molded product was led to a simultaneous biaxial tenter stretching machine, in which a simultaneous biaxial stretching was carried out at 120° C. with magnifying powers in the machine direction and in the transverse direction of 7.0 times and 6.1 times, respectively. Thereafter, the liquid paraffin was extraction-removed.

Further, the resulting product was led to a TD tenter thermo-fixing machine, in which stretching at a ratio of 1.1 was carried out at 125° C., and finally heat-treatment was carried out at 133° C. Physical properties of the microporous membrane thus-obtained are as shown in Tables 1 and 2.

COMPARATIVE EXAMPLE 1

1.5 Weight % of ultra high molecular weight polyethylene having an intrinsic viscosity [η] of 11.5 dl/g, 28.5 wt % of high density polyethylene having an intrinsic viscosity [η] of 2.8 dl/g, 50.6 wt % of dioctyl phthalate (DOP) and 19.4 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm. From the molded product, the DOP and pulverized silica were extraction-removed, thereby obtaining a microporous membrane. Two sheets of the microporous membrane were placed one over the other, stretched by 4.4 times in the machine direction at 110° C., thereafter stretched by 1.7 times in the transverse direction at 133° C., and finally heat-treated at 135° C. Physical properties of the microporous membrane thus-obtained are as shown in Tables 1 and 2.

Because of such a low intrinsic viscosity [η], 3.2 dl/g, the resulting microporous membrane has less strength, i.e., a piercing strength of 2.3 N/20 μm.

COMPARATIVE EXAMPLE 2

3 Weight % of ultra high molecular weight polyethylene having an intrinsic viscosity [η] of 11.5 dl/g, 27 wt % of high density polyethylene having an intrinsic viscosity [η] of 2.8 dl/g, 50.6 wt % of dioctyl phthalate (DOP) and 19.4 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm. From the molded product, the DOP and pulverized silica were extraction-removed, thereby obtaining a microporous membrane. Two sheets of the microporous membrane were placed one over the other and stretched by 4.0 times in the machine direction at 110° C. Physical properties of the microporous membrane obtained are as shown in Tables 1 and 2. The absence of stretching in the transverse direction after the stretching at a ratio of 4.0 in the machine direction resulted in a microporous membrane with increased gas transmission rate, i.e., 800 sec/100 cc/20 μm.

COMPARATIVE EXAMPLE 3

9.2 weight % of ultra high molecular weight polyethylene having an intrinsic viscosity [η] of 16 dl/g, 13.8 wt % of high density polyethylene having an intrinsic viscosity [η] of 2.8 dl/g, 55.9 wt % of dioctyl phthalate (DOP) and 21.1 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm. From the molded product, the DOP and pulverized silica were extraction-removed, thereby obtaining a microporous membrane. Two sheets of the microporous membrane were placed one over the other and stretched by 2.7 times in the machine direction at 110° C. Physical properties of the microporous membrane thus-obtained are as shown in Tables 1 and 2. Because of such a low magnifying power of stretching in the machine direction as 2.7 times, the resulting microporous membrane has low gas transmission rate. However, the strength is lowered to 1.7 N/20 μm in its piercing strength.

COMPARATIVE EXAMPLE 4

A microporous membrane was obtained as in Comparative Example 3, except that the magnifying power of stretching in the machine direction was 3.7 times. Physical properties of the microporous membrane obtained are as shown in Tables 1 and 2. Because the magnifying power of stretching in the machine direction was increased to 3.7 times, the piercing strength reached 2.5 N/20 μm. However, since stretching was carried out in the machine direction only, the polymer was highly oriented in the machine direction, so that the resulting microporous membrane was lowered in its break through temperature.

COMPARATIVE EXAMPLE 5

10.2 Weight % of ultra high molecular weight polyethylene having an intrinsic viscosity [η] of 11.5 dl/g, 10.2 wt % of high density polyethylene having an intrinsic viscosity [η] of 1.8 dl/g, 13.6 wt % of linear low density polyethylene having an intrinsic viscosity [η] of 1.8 dl/g, 45.4 wt % of dioctyl phthalate (DOP) and 20.6 wt % of pulverized silica were mixed and granulated. Thereafter, the granulated product was melt-kneaded in a twin screw extruder equipped with a T die at the leading edge, extruded therefrom, and then rolled from both sides with heated rolls, thereby obtaining a sheet like molded product having a thickness of 110 μm. From the molded product, the DOP and pulverized silica were extraction-removed, thereby obtaining a microporous membrane. Two sheets of the microporous membrane were placed one over the other, stretched by 4.3 times in the machine direction at 117° C., thereafter stretched by 1.9 times in the transverse direction at 120° C., and finally heat-treated at 130° C. Physical properties of the microporous membrane obtained are as shown in Tables 1 and 2. Since the membrane melting point of the membrane stretched in the machine direction is found to be as low as 130° C., it is impossible to increase the transverse stretching temperature and the heat-treatment temperature to 130° C. or higher. As a result, the microporous membrane has high maximum shrinkage stress and a high shrinking percentage.

TABLE 1

|  | Membrane thickness μm | Air transmission rate sec/100 cc/20 μm | Void content % | Piercing strength N/20 μm | Break-through temperature under high temperature condition | Shrinking percentage in transverse direction % | Shrinkage stress in transverse direction kPa |
|---|---|---|---|---|---|---|---|
| Example 1 | 22 | 82 | 52 | 2.7 | 120 | 13 | 196 |
| Example 2 | 22 | 82 | 53 | 2.8 | 125 | 15 | 196 |

TABLE 1-continued

|  | Membrane thickness μm | Air transmission rate sec/100 cc/20 μm | Void content % | Piercing strength N/20 μm | Breakthrough temperature under high temperature condition | Shrinking percentage in transverse direction % | Shrinkage stress in transverse direction kPa |
| --- | --- | --- | --- | --- | --- | --- | --- |
| Example 3 | 22 | 73 | 52 | 2.8 | 125 | 15 | 196 |
| Example 4 | 22 | 80 | 51 | 3.5 | 130 | 18 | 196 |
| Example 5 | 22 | 80 | 51 | 3.5 | 130 | 19 | 196 |
| Example 6 | 23 | 75 | 53 | 2.6 | 125 | 15 | 196 |
| Example 7 | 18 | 90 | 52 | 3.9 | 120 | 18 | 220 |
| Example 8 | 15 | 100 | 52 | 3.9 | 120 | 18 | 240 |
| Example 9 | 12 | 100 | 54 | 4.0 | 120 | 20 | 240 |
| Example 10 | 18 | 90 | 51 | 4.1 | 125 | 16 | 220 |
| Example 11 | 22 | 90 | 52 | 3.4 | 130 | 17 | 193 |
| Example 12 | 18 | 100 | 52 | 3.8 | 125 | 16 | 236 |
| Example 13 | 15 | 130 | 46 | 4.2 | 120 | 12 | 283 |
| Example 14 | 13 | 140 | 46 | 4.4 | 120 | 12 | 327 |
| Example 15 | 18 | 100 | 50 | 3.8 | 125 | 13 | 220 |
| Example 16 | 18 | 100 | 50 | 3.2 | 120 | 15 | 220 |
| Example 17 | 18 | 220 | 43 | 5.0 | 115 | 22 | 408 |
| Example 18 | 18 | 260 | 54 | 4.4 | 115 | 12 | 357 |
| Comparative Example 1 | 22 | 82 | 52 | 2.3 | 115 | 13 | 196 |
| Comparative Example 2 | 25 | 800 | 40 | 3.5 | 105 | 5 | 160 |
| Comparative Example 3 | 34 | 80 | 65 | 1.7 | 100 | 5 | 120 |
| Comparative Example 4 | 25 | 250 | 61 | 2.5 | 105 | 5 | 160 |
| Comparative Example 5 | 22 | 82 | 47 | 3.7 | 100 | 30 | 373 |

TABLE 2

|  | [η] dl/g | B.P. Kpa | Shutdown temperature ° C. | Membrane-rupture temperature ° C. | Membrane melting point ° C. | Melting point of Membrane stretched in machine direction ° C. | Electrical resistance Ω · cm²/20 μm |
| --- | --- | --- | --- | --- | --- | --- | --- |
| Example 1 | 3.6 | 284 | 142 | 155 | 137 | 135 | 0.9 |
| Example 2 | 4.0 | 294 | 142 | 155 | 138 | 136 | 0.9 |
| Example 3 | 4.7 | 324 | 143 | 155 | 138 | 136 | 0.8 |
| Example 4 | 6.0 | 373 | 143 | 155 | 139 | 137 | 0.9 |
| Example 5 | 6.2 | 373 | 144 | 153 | 139 | 137 | 0.9 |
| Example 6 | 7.5 | 275 | 144 | 155 | 139 | 137 | 0.9 |
| Example 7 | 6.2 | 392 | 144 | 153 | 139 | 138 | 1.1 |
| Example 8 | 6.2 | 392 | 145 | 153 | 139 | 138 | 1.2 |
| Example 9 | 6.2 | 392 | 145 | 153 | 139 | 138 | 1.2 |
| Example 10 | 4.9 | 402 | 145 | 156 | 139 | 138 | 1.1 |
| Example 11 | 4.8 | 392 | 143 | 155 | 139 | 138 | 1.1 |
| Example 12 | 4.8 | 363 | 144 | 156 | 139 | 137 | 1.3 |
| Example 13 | 4.8 | 382 | 145 | 156 | 138 | 137 | 1.8 |
| Example 14 | 4.8 | 382 | 146 | 156 | 138 | 137 | 1.8 |
| Example 15 | 5.0 | 363 | 145 | 156 | 140 | 136 | 1.3 |
| Example 16 | 4.2 | 324 | 142 | 156 | 138 | 135 | 1.3 |
| Example 17 | 4.4 | >686 | 140 | 156 | 139 | 137 | 0.9 |
| Example 18 | 4.1 | >686 | 141 | 170 | 139 | 137 | 1.1 |
| Comparative Example 1 | 3.2 | 275 | 142 | 155 | 137 | 135 | 0.9 |
| Comparative Example 2 | 3.6 | >686 | 142 | 155 | 137 | 135 | 1.6 |
| Comparative Example 3 | 7.5 | 490 | 138 | 158 | 135 | 135 | 0.9 |
| Comparative Example 4 | 7.5 | 490 | 144 | 155 | 139 | 139 | 1.8 |
| Comparative Example 5 | 4.5 | 412 | 135 | 153 | 131 | 130 | 0.9 |

INDUSTRIAL APPLICABILITY

The polyolefin microporous membrane in accordance with the present invention is low in gas transmission, superior in permeability and superior in membrane strength and safety under a high temperature condition, and is particularly useful as a separator for a non-aqueous electrolytic solution type battery.

The invention claimed is:

1. A polyolefin microporous membrane, which has a membrane thickness of 5 to 50 μm, a void content of 30 to 60%, a gas transmission rate of 40 to 300 sec/100 cc/20 μm, a piercing strength of not less than 2.5 N/20 μm and a break through temperature of not lower than 110° C. and which comprises a polyolefin having an intrinsic viscosity [η] of from 3.5 to 9 dl/g.

2. The polyolefin microporous membrane according to claim 1, which has a maximum shrinkage stress in the transverse direction of not more than 363 kPa and/or a shrinking percentage at 130° C. in the transverse direction of not more than 25%.

3. The polyolefin microporous membrane according to claim 1, which has a bubble point (B.P.) of 196 to 490 kPa and a shutoff temperature of 138 to 150° C.

4. The polyolefin microporous membrane according to any one of claims 1 to 3, which has a membrane thickness of 5 to 22 µm, a void content of 35 to 60%, a gas transmission rate of 40 to 260 sec/100 cc/20 µm, and a piercing strength of not less than 2.8 N/20 µm.

5. The polyolefin microporous membrane according to any one of claims 1 to 3, which has a membrane thickness of 5 to 20 µm, a void content of 40 to 60%, a gas transmission rate of 40 to 200 sec/100 cc/20 µm, a piercing strength of not less than 3.0 N/20 µm, and a break through temperature of not lower than 120° C.

6. The polyolefin microporous membrane according to any one of claims 1 to 3, which is obtained by using a composition comprising at least a polyolefin, an organic liquid material and silica.

7. A separator for non-aqueous electrolytic solution type batteries, comprising the polyolefin microporous membrane according to any one of claims 1 to 3.

8. A method for evaluating the heat resistance property of a microporous membrane, comprising:

preparing a measurement cell by overspreading a piece of a microporous membrane over a pointed end element having a pointed end like a needle, which is fixed on a support at its end opposite to the pointed end, and fixing the microporous membrane to the support in at least one direction;

heating the measurement cell; and measuring the temperature at which the pointed end breaks through the microporous membrane.

* * * * *